United States Patent [19]

Uejo et al.

[11] 4,337,179
[45] Jun. 29, 1982

[54] POLYAMIDE COMPOSITION

[75] Inventors: Hirozo Uejo; Hideo Ishida, both of Hirakata; Masaaki Shinhama, Osaka, all of Japan

[73] Assignee: Ube Industries, Ltd., Yamaguchi, Japan

[21] Appl. No.: 165,080

[22] Filed: Jul. 1, 1980

[30] Foreign Application Priority Data

Jul. 10, 1979 [JP] Japan .................................. 54-86510
Jul. 10, 1979 [JP] Japan .................................. 54-86511

[51] Int. Cl.$^3$ ............................................. H01B 1/06
[52] U.S. Cl. .................................... 252/511; 524/106; 524/606
[58] Field of Search ..................... 260/37 N; 252/511; 525/6

[56] References Cited

U.S. PATENT DOCUMENTS 3,625,922 12/1971 Ando ..................................... 525/6
4,064,075 12/1977 Hull ..................................... 252/511
4,153,582 5/1979 Puffr et al. .......................... 252/511

Primary Examiner—Lewis T. Jacobs
Attorney, Agent, or Firm—Sherman & Shalloway

[57] ABSTRACT

Disclosed is a polyamide composition comprising a polyamide and, incorporated therein, 0.01 to 20% by weight, based on the composition, of imidazole.

This composition may further comprise electrically conductive carbon black in an amount of 5 to 50% by weight based on the composition.

This polyamide composition is excellent in the fluidity as the melt and a shaped article prepared from this polyamide composition is excellent in the softness.

6 Claims, No Drawings

POLYAMIDE COMPOSITION

BACKGROUND OF THE INVENTION

(1) Field of the Invention

The present invention relates to a polyamide composition. More particularly, the present invention relates to a polyamide composition which has a good fluidity in the molten state and exerts an excellent softness when it is formed into a shaped article. The present invention also relates to an improvement in an electrically conductive polyamide composition comprising a polyamide and electrically conductive carbon black incorporated therein.

(2) Description of the Prior Art

Polyamides per se have a certain softness, but when they are used as thick monofilaments, tubes and hoses, a higher softness is required.

As means for imparting a high softness to polyamides, there have been adopted on an industrial scale a method in which a softening agent such as an aromatic sulfonamide or a p-hydroxybenzoic acid ester is incorporated into polyamides. However, since such known softening agent is liquid, it is difficult to incorporate the softening agent uniformly in a polyamide, and since the compatibility of the softening agent with polyamides is not sufficient, the softening agent exudes to the surface of a shaped article prepared from this polyamide composition, rendering the surface of the shaped article tacky.

It is known that a polyamide can be made electrically conductive by incorporating carbon black at a high content. However, a composition formed by incorporating carbon black at a high content into a polyamide is hard and brittle, and therefore, when a shaped article formed by injection molding of this composition is put out from a mold or while this shaped article is being used, it is readily cracked or broken.

As means for eliminating this defect of a polyamide composition comprising carbon black at a high content, there may be adopted a method in which a softening agent such as mentioned above is incorporated to soften the polyamide composition. Indeed, if such softening agent is incorporated in a large amount, cracking of the shaped article can be prevented. However, since the softening agent is liquid, it is very difficult to incorporate the softening agent in a large amount in the polyamide composition. Furthermore, since the softening agent is poor in the compatibility with polyamides, the softening agent exudes to the surface of the shaped article and renders the surface of the shaped article tacky. Therefore, this method cannot be adopted on an industrial scale.

BRIEF SUMMARY OF THE INVENTION

It is therefore a primary object of the present invention to provide a polyamide composition which is free of the foregoing defects and is excellent in the fluidity in the molten state and also in the softness of a shaped article prepared from this polyamide composition.

Another object of the present invention is to provide an electrically conductive polyamide composition which can be formed into a shaped article which is not readily cracked and has no tackiness on the surface thereof.

In accordance with one fundamental aspect of the present invention, there is provided a polyamide composition comprising a polyamide and, incorporated therein, 0.01 to 20% by weight, based on the composition, of imidazole.

In accordance with another fundamental aspect of the present invention, there is provided an electrically conductive polyamide composition comprising a polyamide and, incorporated therein, 5 to 50% by weight, based on the composition, of carbon black and 0.5 to 20% by weight, based on the composition, of imidazole.

DETAILED DESCRIPTION OF THE PREFERRED EMBODIMENTS

Imidazole that is used in the present invention is a compound which has a melting point of 88° to 89° C. and is solid at normal temperatures, and this compound is quite different from the above-mentioned known softening agents which are liquid at normal temperatures. It is quite surprising that imidazole which is solid at normal temperatures acts effectively as a softening agent for polyamides.

In the present invention, imidazole can be homogeneously incorporated into a polyamide, and imidazole has a good compatibility with polyamides. Accordingly, imidazole does not migrate or precipitate on the surface of a shaped article prepared from the polyamide composition of the present invention, and this shaped article is characterized in that the surface is not tacky at all.

The polyamide composition of the present invention is characterized in that the melt index increases according to the amount incorporated of imidazole.

As the polyamide that is used in the present invention, there can be mentioned, for example, homopolymers of ε-caprolactam, 6-aminocaproic acid, ω-enantholactam, 7-aminoheptanoic acid, 11-aminoundecanoic acid, 12-aminododecanoic acid, 9-aminononanoic acid, α-pyrrolidone and α-piperidone, polymers obtained by polycondensing diamines such as hexamethylene diamine, nonamethylene diamine, undecamethylene diamine, dodecamethylene diamine, metaxylylene diamine and 1,4-bis(aminomethyl)cyclohexane with dicarboxylic acids such as terephthalic acid, isophthalic acid, adipic acid, sebacic acid and cyclohexanedicarboxylic acid, copolymers derived from the foregoing monomers, and mixtures of two or more of the foregoing polymers. It is preferred that the number average molecular weight of the polyamide used in the present invention be 10,000 to 100,000.

In the present invention, imidazole is incorporated in an amount of 0.01 to 20% by weight, preferably 0.1 to 15% by weight, based on the total composition. If the amount of imidazole is smaller than 0.01% by weight, no softness can be imparted to the polyamide, and if the amount of imidazole is larger than 20% by weight, the strength of the polyamide per se is drastically reduced.

The method for incorporating imidazole into the polyamide is not particularly critical, and there may be adopted a method in which imidazole is dry-blended in the polyamide and a method in which the polyamide and imidazole are melt-kneaded.

The polyamide composition of the present invention can be formed into various shaped articles such as monofilaments, tubes and hoses according to the known methods.

The present invention is especially effective for improving the shapeability, softness and electric conductivity of an electrically conductive polyamide composition.

The kind of carbon black that is used in the present invention is not particularly critical in the present invention, but use of carbon black especially excellent in the electric conductivity, such as Vulcan or Ketjen Black is preferred.

In the present invention, carbon black is incorporated in an amount of 5 to 50% by weight, preferably 10 to 40% by weight, based on the total composition. If the amount of carbon black is smaller than 5% by weight, the electric conductivity of the polyamide composition is insufficient, and if the amount of carbon black is larger than 50% by weight, it becomes difficult to incorporate carbon black uniformly into the polyamide.

Imidazole that is used in the present invention exerts excellent functions of not only imparting a good softness to a mixture of the polyamide and carbon black but also improving the electric conductivity of this mixture.

The method for incorporating carbon black and imidazole into the polyamide is not particularly critical, and there may be adopted any of known methods. For example, there may be adopted a method in which the three components are dry-blended and a method in which the three components are melt-kneaded.

The electrically conductive polyamide composition of the present invention may be formed into various shaped articles by known methods. These shaped articles can be effectively used in the fields where static charges are readily produced. For example, they can suitably be used as sliding and bearing parts and shield covers of various electronic parts.

The present invention will now be described in detail with reference to the following Examples and Comparative Examples that by no means limit the scope of the invention.

In these Examples, the melt index (hereinafter referred to as "MI") was measured under a load of 1,000 g at a temperature of 235° C. according to the method of ASTM D-1238. The tensile elongation at break of the shaped article was determined at 25° C. in the absolutely dry state according to the method of ASTM D-638 and the flexural strength, flexural modulus and stroke to break (hereinafter referred to as 37 break stroke") were determined at 25° C. in the absolutely dry state according to the method of ASTM D-790.

The volume resistivity was determined at 23° C. in the absolutely dry state according to the method of ASTM D-257.

In these Examples, all of "parts" are by weight.

EXAMPLES 1 TO 5

A predetermined amount (shown in Table 1) of powdery imidazole was blended into a predetermined amount (shown in Table 1) of nylon-6 having a number average molecular weight of 11,000 by means of a Henschel mixer. The mixture was melt-extruded into pellets by using a single screw extruder having a screw diameter of 30 mm [set temperatures: $C_1=220°$ C., $C_2=C_3=C_4$ (die portion) $=240°$ C.].

The melt index (MI) of the so formed pellets was measured to obtain the results shown in Table 1.

The pellets were molded into test pieces for determination of the physical properties by using an injection molding machine (Model SJ-25B manufactured by Meiki Seisakusho) [set temperatures: $C_1=220°$ C., $C_2=C_3$ (nozzle portion) $=250°$ C., mold temperature $=75°$ C.].

The physical properties of the test pieces were determined. The obtained results are shown in Table 1.

COMPARATIVE EXAMPLE 1

Pellets and test pieces were prepared in the same manner as described in Example 1 except that imidazole was not incorporated. The physical properties were determined to obtain the results shown in Table 1.

TABLE 1

|  | 6-Nylon (parts) | Imidazole (parts) | MI (g/10 minutes) | Tensile Elongation at Break (%) | Flexural Strength ($Kg/cm^2$) | Flexural Modulus ($Kg/cm^2$) |
| --- | --- | --- | --- | --- | --- | --- |
| Example 1 | 95.5 | 0.5 | 51 | 140 | 930 | 25,200 |
| Example 2 | 99.0 | 1.0 | 54 | 180 | 790 | 22,500 |
| Example 3 | 98.0 | 2.0 | 59 | 210 | 700 | 18,800 |
| Example 4 | 95.0 | 5.0 | 75 | 250 | 410 | 11,000 |
| Example 5 | 90.0 | 10.0 | 104 | above 300 | 300 | 8,000 |
| Comparative Example 1 | 100.0 | 0 | 49 | 65 | 1,040 | 27,500 |

EXAMPLE 6

Pellets and test pieces were prepared in the same manner as in Example 2 except that nylon-6,6 having a number average molecular weight of 15,000 was used instead of nylon-6 and the temperatures of the respective parts of the extruder and injection molding machine were increased by 40° C.

The obtained results are shown in Table 2.

COMPARATIVE EXAMPLE 2

Pellets and test pieces were prepared in the same manner as in Example 6 except that imidazole was not incorporated.

The obtained results are shown in Table 2.

EXAMPLE 7

Pellets and test pieces were prepared in the same manner as in Example 2 except that nylon-12 having a number average molecular weight of 20,000 was used instead of nylon-6 and the temperatures of the respective parts of the extruder and injection molding machine were lowered by 20° C.

The obtained results are shown in Table 2.

COMPARATIVE EXAMPLE 3

Pellets and test pieces were prepared in the same manner as in Example 7 except that imidazole was not incorporated.

The obtained results are shown in Table 2.

TABLE 2

|  | Tensile Elongation at Break (%) | Flexural Strength ($Kg/cm^2$) | Flexural Modulus ($Kg/cm^2$) |
| --- | --- | --- | --- |
| Example 6 | 32 | 970 | 26,200 |
| Comparative Example 2 | 18 | 1.120 | 29,200 |
| Example 7 | above 300 | 410 | 9,400 |

TABLE 2-continued

|  | Tensile Elongation at Break (%) | Flexural Strength (Kg/cm$^2$) | Flexural Modulus (Kg/cm$^2$) |
|---|---|---|---|
| Comparative Example 3 | above 300 | 590 | 14,700 |

When the test pieces obtained in Examples 1 to 7 were allowed to stand still at room temperature for 1 month, no surface tackiness was observed in any of the test pieces.

EXAMPLES 8 TO 10

Predetermined amounts (shown in Table 3) of nylon-6 having a number average molecular weight of 11,000, electrically conductive carbon black (Vulcan XC-72 manufactured by Cabot Corp., USA) and powdery imidazole were mixed by means of a Henschel mixer. The mixture was meltextruded into pellets by a kneading extruder (Model PCM-30 manufactured by Ikegai Tekko Kabushiki Kaisha) [set temperatures: $C_1=220°$ C., $C_2=C_3=C_4$ (die portion)$=250°$ C.].

The pellets were formed into test pieces for determination of the physical properties by using an injection molding machine (Model SJ-25B manufactured by Meiki Seisakusho) [set temperatures: $C_1=220°$ C., $C_2=C_3$ (nozzle portion)$=250°$ C., mold temperature$=75°$ C.]. The physical properties of the test pieces were determined to obtain the results shown in Table 3.

Separately, bushings having an outer diameter of 5.15 cm, an inner diameter of 5.00 cm and a length of 5.00 cm were formed from the pellets prepared in each Example by 10 shots (two bushings by one shot) by using the abovementioned injection molding machine. None of the bushings were cracked when they were put out from the mold.

COMPARATIVE EXAMPLE 4

Pellets and test pieces were prepared in the same manner as in Example 8 except that the amount used of nylon-6 was changed to 80 parts and imidazole was not incorporated.

The obtained results are shown in Table 3.

Bushings were prepared by injection molding in the same manner as in Example 8. Ten bushings were cracked when they were put out from the mold.

COMPARATIVE EXAMPLE 5

Pellets and test pieces were prepared in the same manner as in Example 8 except that 2 parts of N-butyl-toluenesulfonamide was used instead of imidazole.

The obtained results are shown in Table 3.

Bushings were prepared by injection molding in the same manner as in Example 8. Two bushings were cracked when they were put out from the mold.

EXAMPLE 11

Pellets and test pieces were prepared in the same manner as in Example 10 except that the amount used of nylon-6 was changed to 80 parts and 10 parts of Ketjen Black EC (manufactured by Lion-Akzo Kabushiki Kaisha) was used as the electrically conductive carbon black.

The obtained results are shown in Table 3.

Bushings were prepared by injection molding in the same manner as in Example 8. None of the bushings were cracked when they were put out from the mold.

COMPARATIVE EXAMPLE 6

Pellets and test pieces were prepared in the same manner as in Example 11 except that the amount used of nylon-6 was changed to 90 parts and imidazole was not incorporated.

The obtained results are shown in Table 3.

Bushings were prepared by injection molding in the same manner as in Example 8. Five bushings were cracked when they were put out from the mold.

When the test pieces prepared in Examples 8 to 11 were allowed to stand still at room temperature for 2 months, no surface tackiness was observed in any of the test pieces.

TABLE 3

|  | Nylon-6 (parts) | Carbon Balck (parts) | Imidazole (parts) | Tensile Elongation at Break (%) | Flexural Strength (Kg/cm$^2$) | Flexural Modulus (Kg/cm$^2$) | Break Stroke (mm) | Volume Resistivity ($\Omega$-cm) |
|---|---|---|---|---|---|---|---|---|
| Example 8 | 78 | 20 | 2 | 4 | 1,050 | 35,000 | 18 | 1,000 |
| Example 9 | 75 | 20 | 5 | 14 | 670 | 24,100 | above 22 | 120 |
| Example 10 | 70 | 20 | 10 | 21 | 450 | 11,600 | above 22 | 5 |
| Comparative Example 4 | 80 | 20 | 0 | 3 | 1,200 | 39,200 | 11 | 1,400 |
| Comparative Example 5 | 78 | 20 | NBTB*, 2 | 3 | 1,110 | 34,700 | 12 | 1,800 |
| Example 11 | 80 | 10 | 10 | 13 | 410 | 8,600 | above 22 | 100 |
| Comparative Example 6 | 90 | 10 | 0 | 2 | 740 | 35,900 | 15 | 1,500 |

Note
*NBTB represents N-butyltoluene-sulfonamide.

What is claimed is:

1. An electrically conductive polyamide composition which comprises a polyamide and, incorporated therein, 0.01 to 20% by weight, based on the composition, of imidazole and 5 to 50% by weight, based on the composition, of carbon black.

2. A polyamide composition as set forth in claim 4 wherein the polyamide is a linear polyamide having a number average molecular weight of 10,000 to 100,000.

3. A polyamide composition as set forth in claim 4 wherein the amount of imidazole is 0.1 to 15% by weight based on the composition.

4. An electrically conductive polyamide composition as set forth in claim 1 wherein the amount of imidazole is 0.1 to 5% by weight based on the composition.

5. An electrically conductive polyamide composition as set forth in claim 1 wherein the amount of carbon black is 10 to 40% by weight based on the composition.

6. A shaped article prepared from an electrically conductive polyamide composition as set forth in claim 1 by melt-molding thereof.

* * * * *